United States Patent [19]

Yabushita et al.

[11] Patent Number: 5,214,775
[45] Date of Patent: May 25, 1993

[54] HIERARCHY STRUCTURED MEMORY SYSTEM CONTAINED IN A MULTIPROCESSOR SYSTEM

[75] Inventors: Masaharu Yabushita, Sagamihara; Hidehiko Akita, Ota; Masahiro Kainaga, Yokohama, all of Japan

[73] Assignee: Hitachi, Ltd., Tokyo, Japan

[21] Appl. No.: 530,398

[22] Filed: May 30, 1990

[30] Foreign Application Priority Data

May 30, 1989 [JP] Japan .................................. 1-134663

[51] Int. Cl.⁵ ............................................ G06F 13/36
[52] U.S. Cl. .................................... 395/200; 395/425; 395/400
[58] Field of Search .................. 364/DIG. 1, DIG. 2; 395/200, 425, 325, 400

[56] References Cited

U.S. PATENT DOCUMENTS 4,550,368 10/1985 Bechtolsheim ...................... 395/400
4,827,406 5/1989 Bischoff et al. .................... 395/325 X Primary Examiner—Robert L. Richardson
Attorney, Agent, or Firm—Antonelli, Terry, Stout & Kraus

[57] ABSTRACT

A multiprocessor having a plurality of processor elements connected in a cascaded manner. A memory is shared between each processor element and a processor adjacent in an upper or lower rank to the processor. In the lower processor element, there are disposed an arbiter for arbitrating a memory access with its upper processor element and a bus selector for switching a bus with the arbiter. The processor elements are connected in a multistage tree structure by a bus connection only. From the upper processor element, therefore, there can be accessed the shared memory in the lower processor element only through an external bus. The whole system is not limited by the address space of each processor and the bus, even if the address space is finite, so that the real memory capacity can be limitlessly expanded in a manner to correspond to the internal memory of each processor element.

17 Claims, 12 Drawing Sheets

S: SEGMENT NUMBER
P: PAGE NUMBER
RA: REAL ADDRESS (PHYSICAL ADDRESS)

FC : FUNCTION CODE
DL : DATA LENGTH
S  : SEGMENT NUMBER
P  : PAGE NUMBER
RA : PHYSICAL ADDRESS
D  : SENDING AND RECEIVING DATA

FIG. 14

| SEGMENT | PAGE | |
|---|---|---|
| S = 0 | P = 0 | |
| | P = 1 (LOWER) | ⎫ |
| | ⋮ | |
| | NO MEMORY IMPLEMENTED | SAME MEMORY |
| | ⋮ | |
| S = 1 | P = 0 | ⎭ |
| | P = 1 (LOWER) | ⎫ |
| | ⋮ | |
| | NO MEMORY IMPLEMENTED | SAME MEMORY |
| | ⋮ | |
| S = 2 | P = 0 | ⎭ |
| | ⋮ | |
| | NO MEMORY IMPLEMENTED | |
| | ⋮ | |

FIG. 15

| SEGMENT | PAGE | |
|---|---|---|
| S = 0 | P = 0 | |
| | P = 1 (LOWER) | ⎫ |
| | NO MEMORY IMPLEMENTED | ⎬ SAME MEMORY |
| S = 2 | P = 0 | ⎭ |
| | ⋮ NO MEMORY IMPLEMENTED ⋮ | |

FIG. 16

| SEGMENT | PAGE |
|---|---|
| S = 0 | P = 0 |
| | ⋮ NO MEMORY IMPLEMENTED ⋮ |

HIERARCHY STRUCTURED MEMORY SYSTEM CONTAINED IN A MULTIPROCESSOR SYSTEM

BACKGROUND OF THE INVENTION

1. Field of the Invention

The present invention relates to a multiprocessor system having a shared memory and, more particularly, to a multiprocessor system, in which each processor element has a dedicated arbiter and a shared memory between itself and its upper processor element, and a method therefor.

2. Description of the Prior Art

In a prior art, the multiprocessor system having the shared memory is known as exemplified by "Nikkei Electronics, Vol. 407 (issued on Nov. 3, 1986)", pp. 119 to 129. FIG. 4 is a block diagram showing the schematic structure of the aforementioned system of the prior art.

In the microprocessor system having the shared memory according to the prior art, as shown in FIG. 4, one shared memory is connected with a common bus between two or more microprocessor units CPU 1, CPU 2, - - -, and so on, and a bus arbiter is also connected for arbitrating the conflict of the access to the shared memory.

In the above-specified conventional system, the capacity of the shared memory is limited to the address space (i.e., the address width capable of being expressed in the bit width of the shared bus) of the shared bus, thus raising a problem of shortage of its expandability. In order to expand and increase the size of the system thereby to improve the processing performance, more specifically, it is conceivable to expand and augment the memory capacity and to increase the number of the processor elements (i.e., the CPU 1, the CPU 2, - - -, and so on). In the system of the prior art, however, a shared memory in an external position is accessed from each processor element through the common arbiter and the common external bus so that any expanded system cannot be realized due to the bottleneck of the common bus even if the number of CPUs or the capacity of the memory is merely increased. In other words, the accesses of the individual CPUs conflict one another so that the processing performance (or throughput) matching the number of the CPUs cannot be attained even if only the number of the CPUs is increased while leaving the common bus as it is. It is also conceivable to reform the arbiter and the bus wiring together with the increases in the number of the CPUs and in the memory capacity so that the performance of the system in its entirety may be enhanced. However, this concept requires much labor and high cost, and it is uneconomical for preparing system for expansion in the future by disposing a bus having a wide address in advance.

Thus, in the existing multiprocessor system of the shared memory type, the maximum access space of the shared memory is equal to the address space of the common bus, which has its size limited thus making it difficult to subsequently increase the real memory capacity. In this system, moreover, one OS shared among a plurality of processors is arranged over the shared memory so as to centralize the management of the shared memory. As a result, the bus accessing frequency is increased to limit the number of processors to be added so as to eliminate the aforementioned bus bottleneck, thus limiting realization of a new function.

On the other hand, range of the data to be accessed by each processor is not efficient despite many parts proper to each processor, if the centralized shared memory is always used for such data. It is, therefore, desirable to distribute the functions of the individual processors to eliminate the centralization of the data while retaining the merits of the centralized system of the prior art.

SUMMARY OF THE INVENTION

It is, therefore, an object of the present invention to solve the above-specified technological problems of the prior art and to provide a multiprocessor system and a method therefor, which is free from having its real memory capacity limited by the bottleneck of the address space of a bus and from any data centralization by distributing the functions of individual processors and further which permits expansion of the system by connecting the individual processors sequentially by only a memory bus connection without any drastic reconstruction of the memory bus or the arbiter when the functions of the system are to be expanded and large-scaled.

In order to achieve the above-specified object, according to the present invention, there is provided a microprocessor system or a multiprocessor system of the type in which each of processor elements has a memory built therein. Each processor element comprises in addition to the aforementioned memory: a CPU; an address translator for translating a logical address outputted from the CPU into a physical address and for outputting it to an internal memory bus or an external memory bus; and a bus arbiter/selector (i.e., an arbiter for arbitrating a memory access between upper and lower ranks, and a bus selector for switching the bus in accordance with the output of the arbiter) for arbitrating access between the bus master of the memory bus of the upper processor element and the CPU to select and switch the bus so as to share said memory between the two (i.e., the bus master of the upper processor element and the CPU, that is, the upper processor element and the lower processor element). These processor elements can be connected sequentially in a multistage manner (e.g., in a tree structure having upper/lower relations) by only a memory bus connection (i.e., the connection by the aforementioned external memory bus, which is composed of an address bus, a data bus and a control bus (e.g., an address strobe, a read strobe, a write strobe or a weight control signal)).

Incidentally, the multiprocessor system of the present invention should not be restricted to the narrow one of the prior art named so but can cover a multiprocessor system widely, in which a plurality of processor elements are connected by a network having an arbitrary structure.

Each processor element has a virtual address space and accesses a memory built in itself by accessing in the virtual address space, when the target real memory area is in the memory built therein, and a memory built in a lower (than itself) processor element when the target real memory area is in the memory built in the lower processor element. In these ways, the memory built in each processor element is shared between itself and an upper (than itself) processor element (however, the real memory built in itself need not be shared with its lower processor element).

Moreover, the whole system can be realized in a small size and at a reasonable cost merely by packaging the aforementioned processor element in one chip to connect a plurality of chips.

Still moreover, a physically and logically remote processor element is equipped with both an active remote address & data communication controller having a general purpose communication interface and a passive remote address & data communication controller having a general purpose communication interface, so that an access can be accomplished from each processor element as if a memory interface were used.

Incidentally, in order to realize an arbitrary function distribution, there is disposed in a portion of the shared memory of each processor element a register which can register the function of each processor element from its upper processor element or a processor in processor element, so that the processing function of each processor element can be dynamically changed or added.

When an abnormality of an adjoining upper processor element is informed to a lower processor element through the shared memory by a self diagnosis of each processor element between itself and an adjoining upper processor, the function to be changed is registered in the aforementioned register so that the processor element itself informed of the abnormality may promptly change its own function. Thus, a group of processor elements lower than the processor element can be controlled independently of the upper processor by disconnecting said upper processor.

The operations of the aforementioned structure will be described in the following.

In a multiprocessor including a plurality of processor elements each having a memory stored therein for storing data, according to the present invention, there are provided: an arbiter which is disposed in a lower one of vertically adjacent processors for arbitrating a memory access between each processor element and an upper processor element so as to share the memory between itself and the adjacent processors; and a bus selector for switching a bus in accordance with the output of said arbiter. These processor elements are connected in a multistage (e.g., in a tree structure) by a memory bus connection only. As a result, the shared memory in the lower processor element can be accessed from the upper processor element by only the external bus which is composed of the address bus, the data bus and the control bus (e.g., the address strobe, the read strobe, the write strobe or the weight control signal).

Moreover, each processor element has a virtual address space proper to itself so that it accesses the shared memory through the virtual address space. More specifically, the external specifications, as seen from the upper processor element, are such that the processor element acts as a memory, while for the lower processor element, it acts as a computing unit using its lower processor element as the memory. As a result, by connecting the vertically adjacent processor elements of an identical structure sequentially in the multistage through the memory bus only, the whole system is not restricted by the address space of each processor and the bus, even if the address space is finite, so that the real memory capacity can be limitlessly expanded in a manner to correspont to the internal memory of each processor element. Still moreover, all the processor elements look as if they were stored memories of the same kind, as seen from the upper processor element, so that the memories existing in the virtual memory space can be unified. As a result, the whole system can be easily constructed merely by wiring the individual processor elements directly or through a driver/receiver without preparing any special external logic such as a bus arbitration control.

Since each processor element has an internal memory shared with its upper processor element, the functions can be easily distributed from the upper processor element to the lower processor element by registering the functions to be borne.

The foregoing and other objects, advantages, manner of operation and novel features of the present invention will be understood from the following detailed description when read in connection with the accompanying drawings.

BRIEF DESCRIPTION OF THE DRAWINGS

FIG. 14 is a diagram showing the memory space of the uppermost processor element $PE_0$ in the structure of FIG. 13;

FIG. 15 is a diagram showing the memory space of an intermediate processor element $PE_1$ in the structure of FIG. 13; and FIG. 16 is a diagram showing the memory space of the lowermost processor element $PE_2$ in the structure of FIG. 13.

DETAILED DESCRIPTION OF THE PREFERRED EMBODIMENTS

The present invention will be described in the following in connection with the embodiments thereof with reference to the accompanying drawings.

Figure 1:
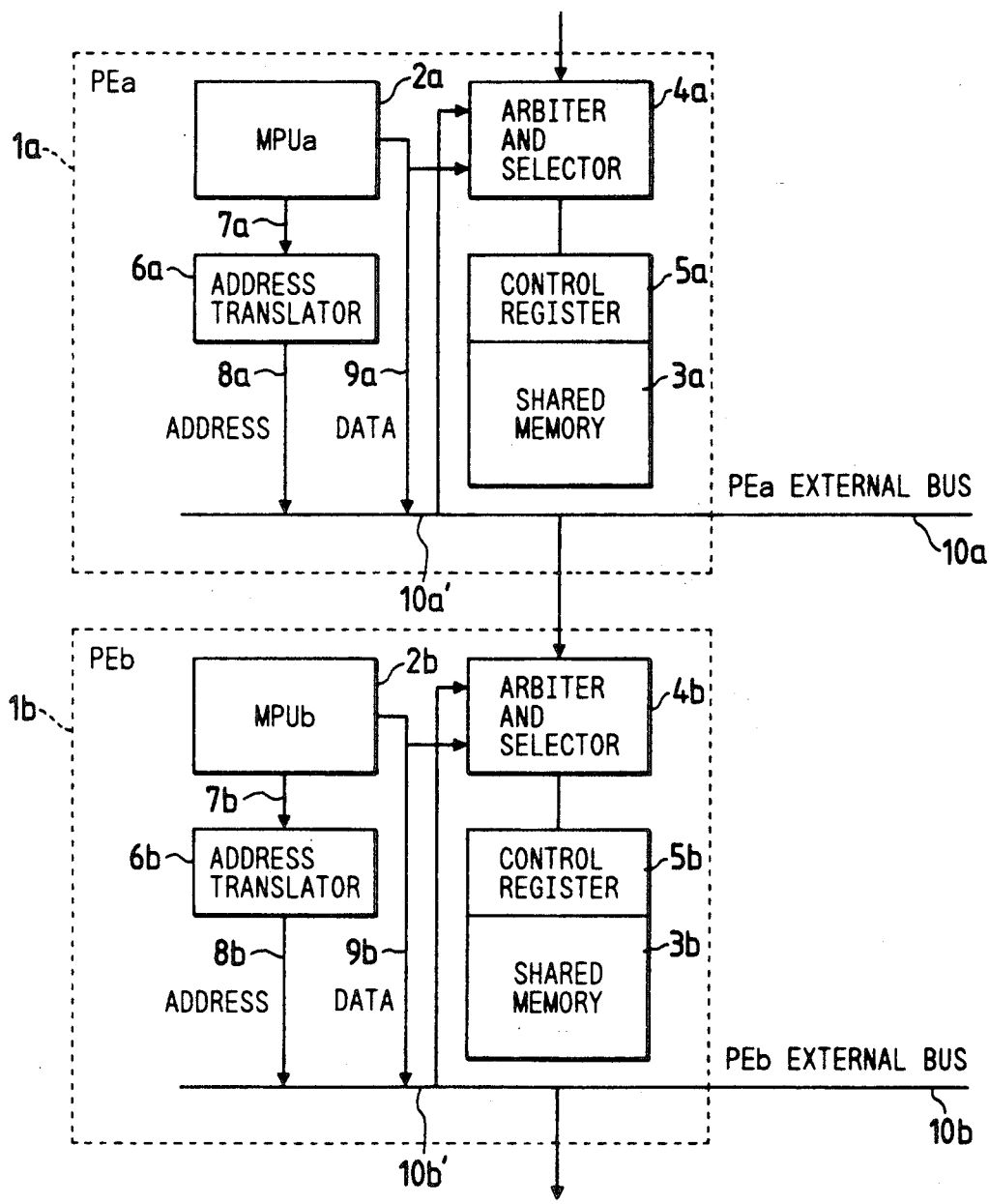
FIG. 1 is a diagram showing one embodiment of a microprocessor system according to the present invention.

FIG. 1 is a diagram showing the structure of one embodiment of a microprocessor system to which is applied the present invention. Two processor elements (PEa) 1a and (PEb) 1b are arranged at upper and lower ranks, respectively. Each PE 1 (1a or 1b) is constructed of: an internal processor MPU 2 (2a or 2b); a shared memory 3 (3a or 3b) shared with the upper processor element; a bus arbiter and selector 4 (4a or 4b) for arbitrating a conflict with the bus master of the memory bus or the like of the upper processor element with respect to an access to the aforementioned shared memory 3; a control register 5 (5a or 5b) which can be accessed by both the upper processor element and the internal processor element through the bus arbiter and selector 4 (4a or 4b); and an address translator 6 (6a or 6b) for translating a logical address 7 (7a or 7b) outputted from the MPU 2 into a physical address 8 (8a or 8b). Incidentally, reference characters 10a and 10b designate external buses for coupling the individual processor elements, and characters 10a' and 10b' designate internal buses in the individual processor elements. In the present embodiment those internal and external buses are directly connected.

In FIG. 1, the internal processor MPUa (2a) of the PEa (1a) shares the shared memory 3b built in the PEb (1b) with the internal processor MPUb (2b) of the PEb (1b) through the bus arbiter and selector 4b of the PEb (1b). The PEa (1a) assigns the memory 3b, which is shared with the PEb (1b), to a portion of a virtual address space of the MPUa (2a) and translates the logical address 7a of the MPUa (2a) to the physical address 8a of the MPUb (2b) through the address translator 6a. A data line 9a of the MPUa (2a) is directly inputted to and outputted from the external bus 10a of the PEa (1a) and is connected to the bus arbiter and selector 4a so that it is inputted to and outputted from the shared memory 3a or the control register 5a in accordance with the arbitration of said arbiter. In order to register the lower processor PEb (1b), the upper processor PEa (1a) a function code indicating a function to be shared, in either the control register 5b in the shared area in the PEb (1b) or a buffer memory. The PEb (1b) executes a predetermined function corresponding to a function code in the control register 5b with reference to the function code. In other words, in case a number of aforementioned processor elements are used, the PEs such as the PEa (1) or PEb (1b) of FIG. 1 are cascaded in a multistage so that real memories can be arranged in the logical address space of the PEa (1a) and logical address space of the PEb (1b). These real memories are exemplified by processor-attached memories having a structure similar to that of the PEa (1a) and the PEb (1b). Thus, the real memory capacity can be arbitrarily expanded by expanding the logical address space sequentially in the multistage.

Figure 2:
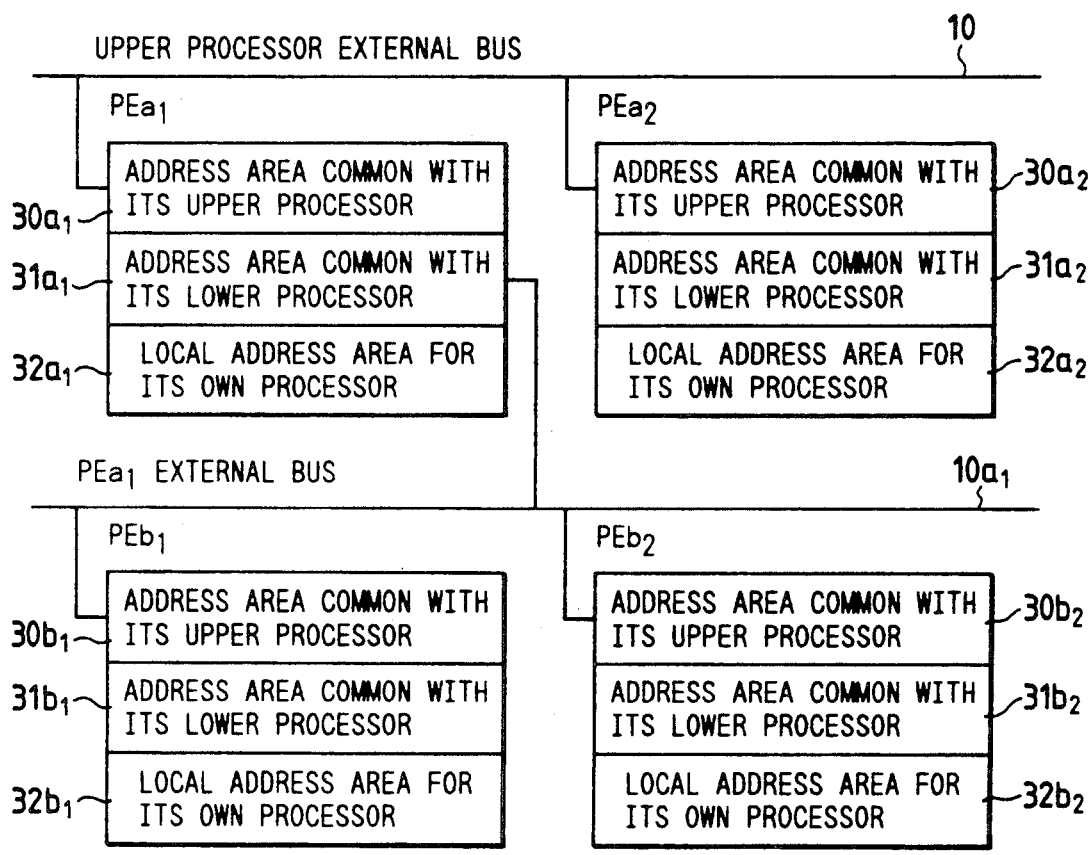
FIG. 2 is a diagram showing an address area assignment for the memory areas of each processor element according to the present invention.

FIG. 2 shows the address assignments to the memory areas of the individual processor elements according to the present invention. In the present embodiment, the two processor elements are connected in juxtaposition to a common hierarchy, and two processor elements are connected in juxtaposition to the lower hierarchy of one of the processor elements. Specifically, processor elements $PEa_1$ and $PEa_2$ are connected in juxtaposition to the external bus 10 of the upper processor element (although not shown), which can access common address areas 30a ($30a_1$ and $30a_2$). However, the $PEa_1$ and $PEa_2$ at an identical rank are independent so that they cannot access the address area 30a common with each other processor element. The memory of each of the processor elements $PEa_1$ and $PEa_2$ is constructed of: the address area 30a ($30a_1$ or $30a_2$) common with its upper processor element; an address area 31a ($31a_1$ or $31a_2$) common with its lower processor element; and a local address area 32a ($32a_1$ or $32a_2$) for its own processor element. Next, the $PEa_1$ has the $PEb_1$ and $PEb_2$ as its lower processor elements and has the address area $31a_1$ common with those lower processor elements. What should be noted here is that the area $31a_1$ is not the real memory of its own processor element unlike the area 30a or 32a, and that the real memory exists in the address areas $30b_1$ and $30b_2$ of the lower processor elements $PEb_1$ and $PEb_2$ common with their upper processor elements. Thus, the processor element $PEa_1$ can make an access through the area $31a_1$ to the address area $30b_1$ or $30b_2$ common with its lower processor element $PEb_1$ or $PEb_2$. However, the $PEb_1$ and $PEb_2$ cannot access their mutual common address areas. Thus, the $PEb_1$ and $PEb_2$ take a memory structure similar to that of the $PEa_1$, and the total system can be constructed of only the memory bus interface by cascading the processor elements having a similar structure sequentially in the multistage. As is apparent from the description thus far made, in FIG. 1 the address areas 30 to 32 of the individual PEs indicate the memory areas which can be accessed by the individual PEs when a view is made downward from the input sides of the address translators 6 (6a, 6b, - - - , and so on) of the individual PEs. It is apparent that the functions can be distributed for fitting applications by registering the functions of the individual processor elements in conformity to the related forms of the functions and by connecting the processor elements in the form of a tree structure conforming to the related forms of the functions through the aforementioned memory bus, because the individual processor elements are equipped with the control registers for registering the function codes indicating the function shares of the processor elements.

Figure 3:
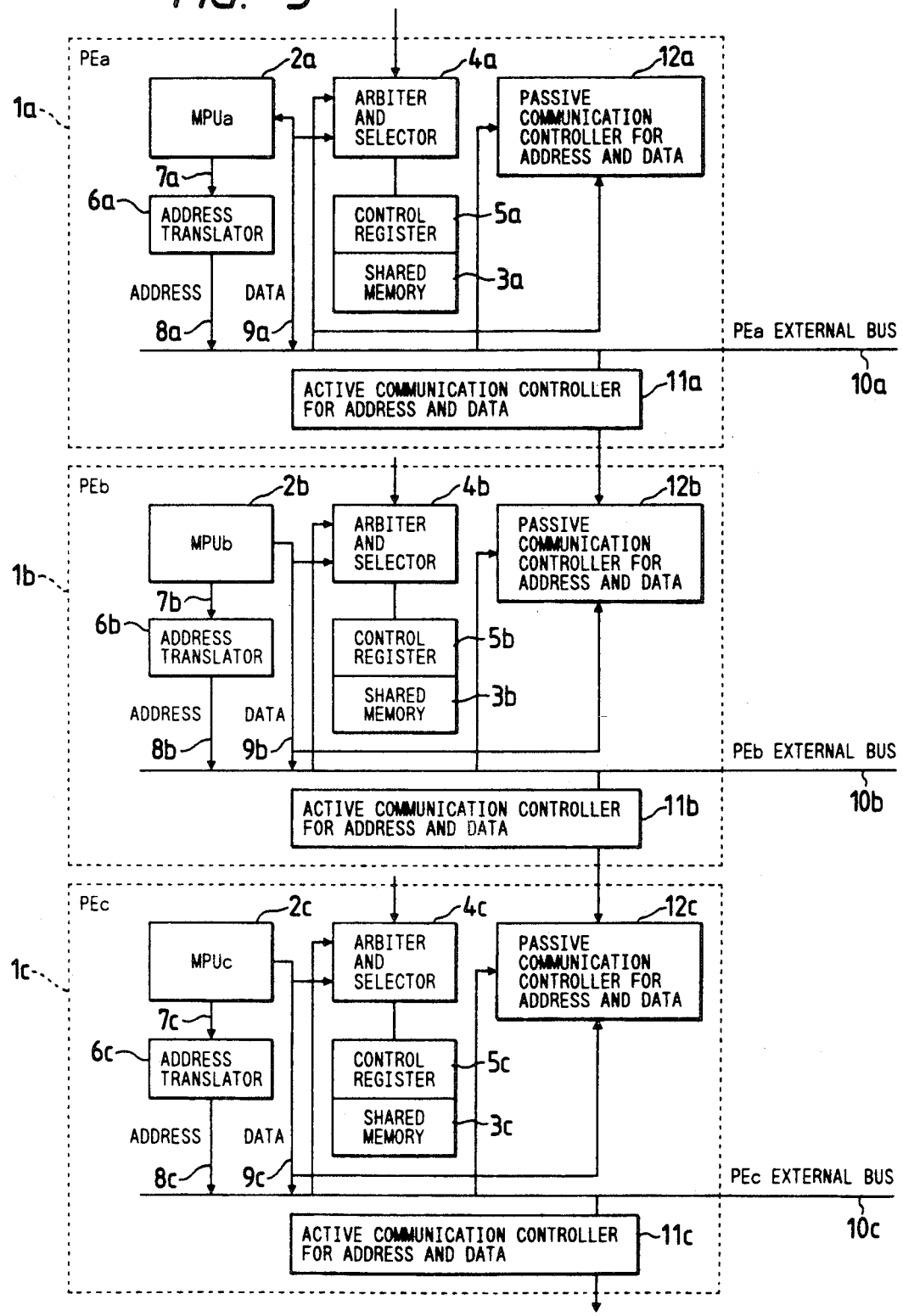
FIG. 3 is a diagram showing the structure of one embodiment of the microprocessor system having a connection with a remote processor in accordance with the present invention.
Figure 4:
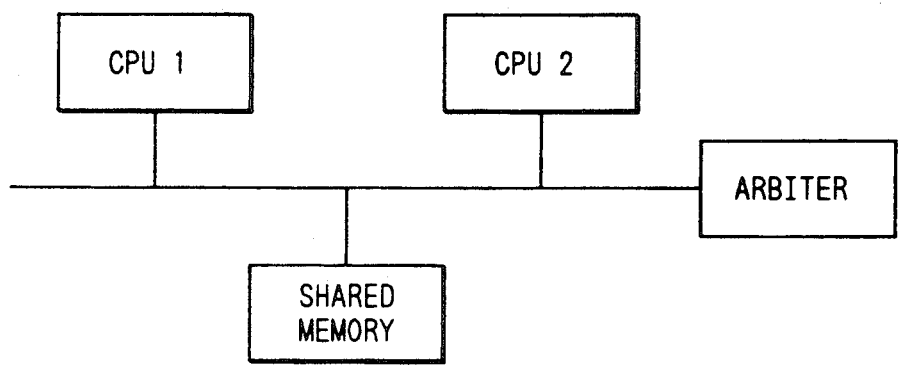
FIG. 4 is a diagram showing the structure of an existing example of the multiprocessor having the shared memory.

Next, it will be described with reference to FIG. 3 that accesses are made to processor elements which are physically and logically apart from each other. In FIG. 3, the parts identical to those of FIG. 1 are designated at identical reference characters, and their descriptions will be omitted. FIG. 3 shows the logical address outputs in case the upper processor element (PEa) 1a and the lower processor elements (PEb) 1b and (PEc) 1c are so physically and logically apart from each other so that they cannot access the buses directly. The PEa (1a) has an active address and data communication controller 11a for detecting that the logical address outputted to the external bus of the PEa (1a) is one assigned to a physically and logically remote processor element, to transmit said logical address and data to the PEb (1b). The active address and data communication controller 11a has a general purpose communication interface such as a MODEM or LAN for connecting the processor elements. On the other hand, the lower processor element PEb (1b) receives as I/O data the addresses and data, which are outputted from the upper processor element PEa (1a) by the active address and data communication controller 11a having the aforementioned general purpose communication interface, through a passive address and data communication controller 12b. The logical addresses thus received are translated to and outputted as the own logical addresses of said processor by the judgment of the same. Likewise, the PEb (1b) can access a physically and logically apart lower processor element PEc (1c) through an active address and data communication controller 11b and a passive address and data communication controller 12c.

The multiprocessor according to the present invention will be described in detail with reference to FIGS. 5 to 10. Each of the processor elements PEs of the multiprocessor has an address format, as shown in FIG. 5.

Figure 5:
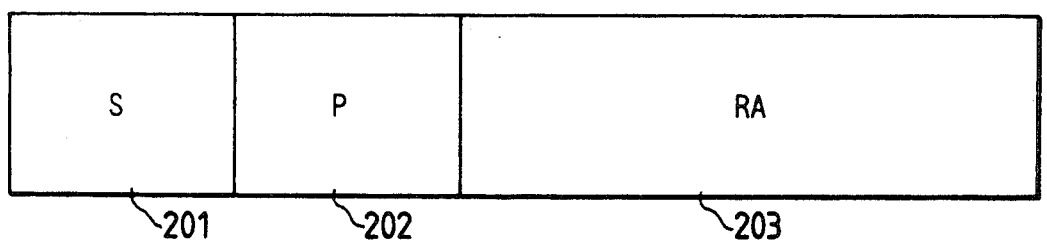
FIG. 5 is a diagram showing an example of an address format of each processor element in the present invention.

In FIG. 5, letter S (201) designates a segment number, and letter P (202) designates a page number, both of which are used as the logical address or the physical address. Letters RA (203) designate a lower address of the segment and page, i.e., the physical address.

Figure 6:
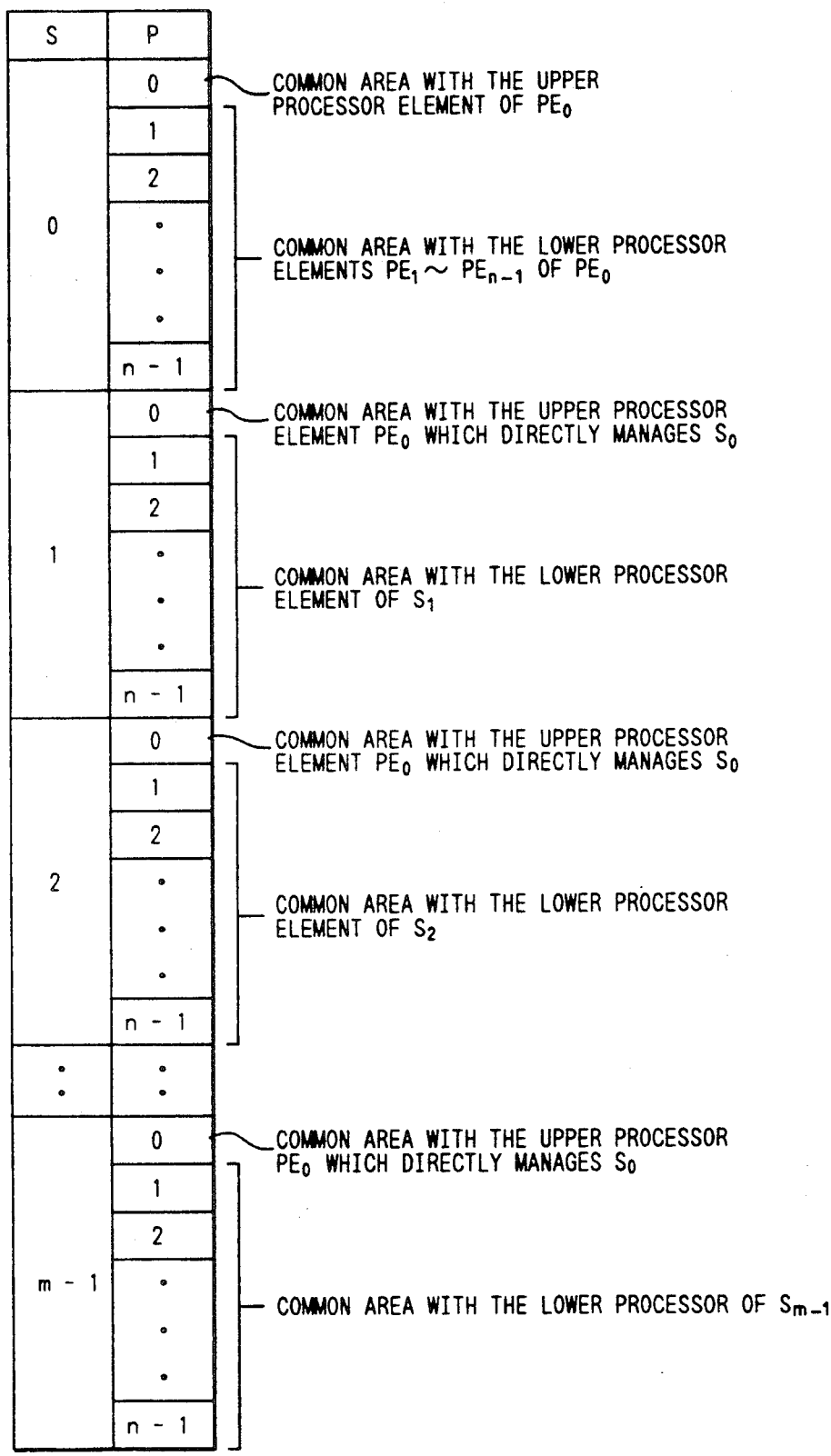
FIG. 6 is a diagram showing one example of a memory space of the processor element according to the present invention.
Figure 7:
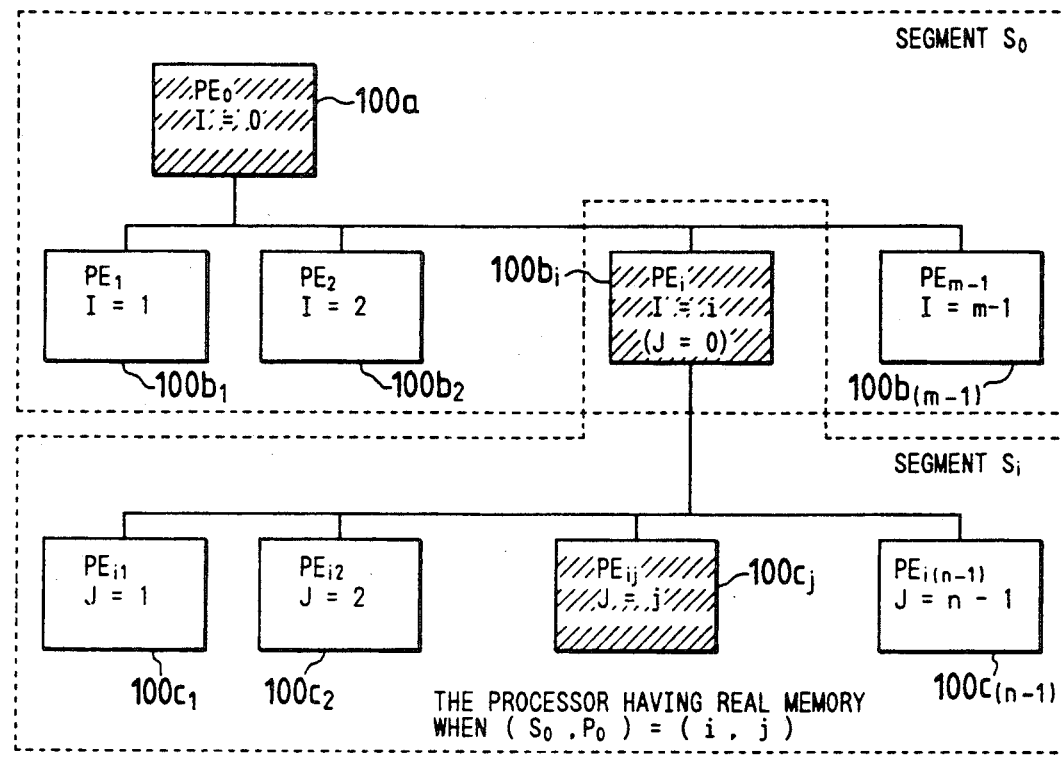
FIG. 7 is a block diagram showing a processor structure for indirectly accessing a two-stage lower processor from an upper processor.

Next, FIG. 6 shows an address space of one processor element (as designated at PEo). FIG. 7 shows a processor structure corresponding to FIG. 6.

The address space of the PEo is composed of an m number of segments $S_0, S_1, S_2, ---, S_i, ---$, and $S_{m-1}$, each of which $S_i$ is composed of an n number of pages $P_0, P_1, P_2, ---$, and $P_{n-1}$. Here, the segment $S_0$ (i.e., the segment in the column of S=0 in FIG. 6) is belongs to the address space which can be directly accessed by the processor element PEo (i.e., 100a of FIG. 7). Likewise, the segments $S_1$ to $S_{m-1}$ (i.e., the segments in the column of $S=1 \sim m-1$ in FIG. 6) respectively belong to the address spaces which can be directly accessed by the processor elements $PE_1$ to $PE_{m-1}$ (i.e., $100b_1$ to $100b_{m-1}$ of FIG. 7).

The page $P_0$ of the segment $S_0$ (i.e., the segment in the column of P=0 in FIG. 6) is not only the internal memory of the processor element PEo but also the common area with the upper processor element (although not shown) of the processor element PEo. This area corresponds to the area 30 of FIG. 2. Likewise, the pages $P_1$ to $P_{n-1}$ (i.e., the columns of S=0 and P=1 to n-1 in FIG. 6) are not only the real memory area which can be directly accessed by the $PE_0$ but also the common memory area with the lower processor elements $PE_1$ to $PE_{n-1}$ (i.e., $100b_1$ to $100b_{m-1}$ of FIG. 7) of the $PE_0$ (i.e., 100a of FIG. 7). This area corresponds to the area 31 of FIG. 2. Incidentally, the present embodiment is not equipped with any one corresponding to the local area 32 for its own process in FIG. 2.

The segments $S_1$ to $S_{m-1}$ are the logical address areas of the $PE_0$ so that they can be accessed not directly from the $PE_0$ but through the $PE_1$ to $PE_{m-1}$. In FIG. 7, letter I designates the processor element numbers 0, 1, 2, ---, and (m-1) in the space of the segment $S_0$, and letter i designates an arbitrary one of them. Letter J designates the process element numbers 0, 1, 2, ---, and (m-1) in the space of the segment $S_i$, and letter j designates an arbitrary one of them. The $PE_1$ to $PE_{m-1}$ ($100b_1$ to $100b_{m-1}$) are at a mutually equal rank and just lower than the $PE_0$ (100a). Moreover, the $PE_{i1}$ to $PE_{i(n-1)}$ ($100c_1$ to $100c_{n-1}$) are at a mutually equal rank and just lower than the $PE_i$ ($100b_i$). The $PE_i$ is shared by the spaces $S_0$ and $S_i$. Specifically, in FIG. 6, the area of S=0, P=i and the area of S=i and P= are actually identical.

According to this structure, in case the processor element $PE_0$ (100a) accesses the page $P_j$ of the segment $S_i$, the logical address outputted by the $PE_0$ (100a) is once stored in the address register for the interface with an upper processor, which is built in a processor element $PE_i$ ($100b_i$) (i.e., the processor element capable of directly accessing a page in the segment $S_i$) and is referred to by a software until it is outputted as the logical address of the processor element $PE_i$ to lower processor elements $PE_{i1}$ to $PE_{i(n-1)}$ ($100c_1$ to $100c_{(n-1)}$) of the $PE_i$. Thus, the $PE_i$ ($100b_i$) accesses the shared memory with the corresponding processor element $PE_{ij}$ ($100c_j$) of the $PE_{i1}$ to $PE_{i(n-1)}$.

Figure 8:
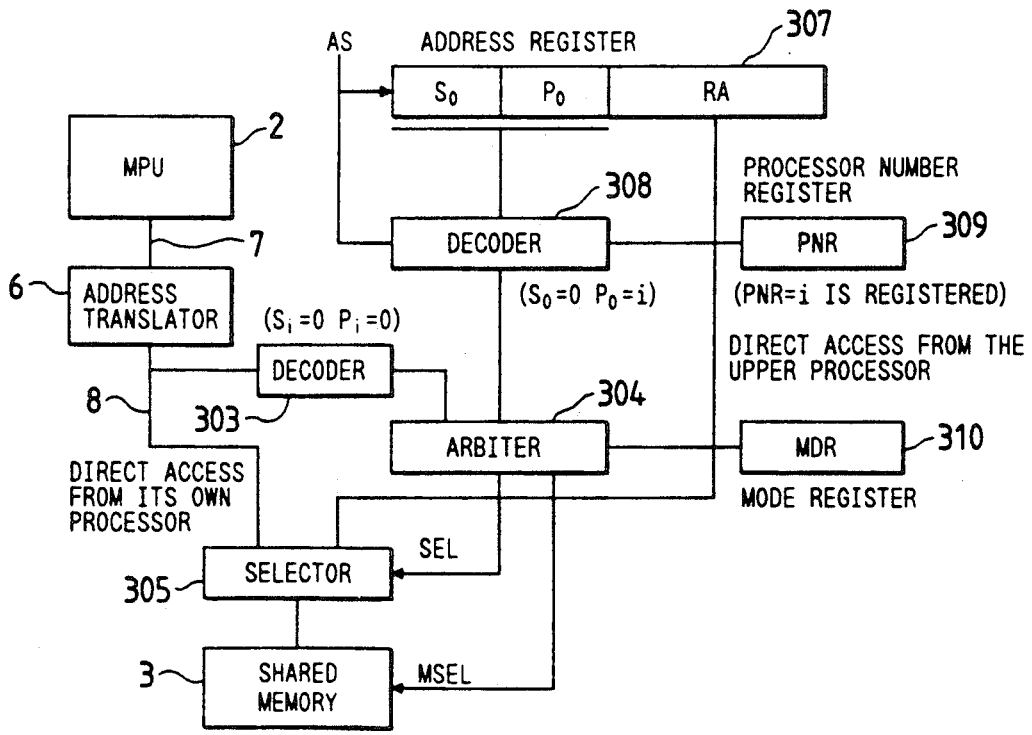
FIG. 8 is a diagram for explaining an address translation in the case of a direct access in the present invention.

Next, FIG. 8 presents a diagram for explaining an address translation in the case of the direct access. The explanation is started from the case in which the processor element $PE_i$ accesses the shared memory with its upper one, i.e., its own internal memory. The $MPU_i$ 2 in the $PE_i$ outputs the logical address 7 in accordance with the address format of FIG. 5, translates its logical address through the address translator 6 into the physical address 8 and accesses it as the internal memory area (as assumed for $S_i=0$ and $P_i=0$) of its own processor $MPU_i$ 2. The physical address 8 or the output of the address translator 6 is inputted to a decoder 303, which in turn detects the assumption of $S_i=0$ and $P_i=0$ to output a bus request signal to an arbiter 304. This arbiter 304 accords to the mode, which is registered in advance in the $MPU_i$ 2, to arbitrates the access coming from the processor element (e.g., $PE_o$ in this case) just upper the $PE_i$ and the access of its own processor element. The arbitration mode can be exemplified by the preference of the processor element owned by itself, the preference of its upper processor element, the equivalent access of both processors or the single access of its own processor element. This mode is set by the registration of a mode register 310 by the $MPU_1$ 2. In other words, the arbitration mode can be dynamically switched.

In accordance with the arbitration result of the arbiter 304, a bus selection signal SEL and a memory select signal MSEL are outputted. When the SEL is at "0", for example, its own processor element is selected. For the SEL="1", the upper processor element is selected. When the shared memory is selected in response to the memory select signal MSEL outputted from the arbiter, the physical address RA of its own processor $MPU_i$ or the upper processor element $PE_o$ is selected by a selector 305 so that said address in the shared memory 3 can be accessed. In case the shared memory 3 is to be accessed from the upper processor element $PE_o$, the address from the external bus of the $PE_o$ is latched with an address strobe AS indicating the validity of the address when in an external bus cycle and is stored in the address register 307. If the address from the $PE_o$ is expressed at $S_o, P_o$ and RA, as indicated in an address register 307 of FIG. 8, the outputs are $S_o=0$ and $P_o=i$ so as to access the shared memory 3 with the $PE_i$ so that the shared memory 3 can be accessed through the arbiter 304 in accordance of the decoded result of a decoder 308 for decoding the output of the address register 307. At this time, the page number P used as the decode signal indicating the address of its own processor element $PE_i$ is different for each PE so that it is set in advance under the upper processor. If an external circuit such as an internal switch is required, the cost is raised by the increase of an external device. Thus, there is provided a processor number register (PNR) 309 which is built in the processor element.

Figure 9:
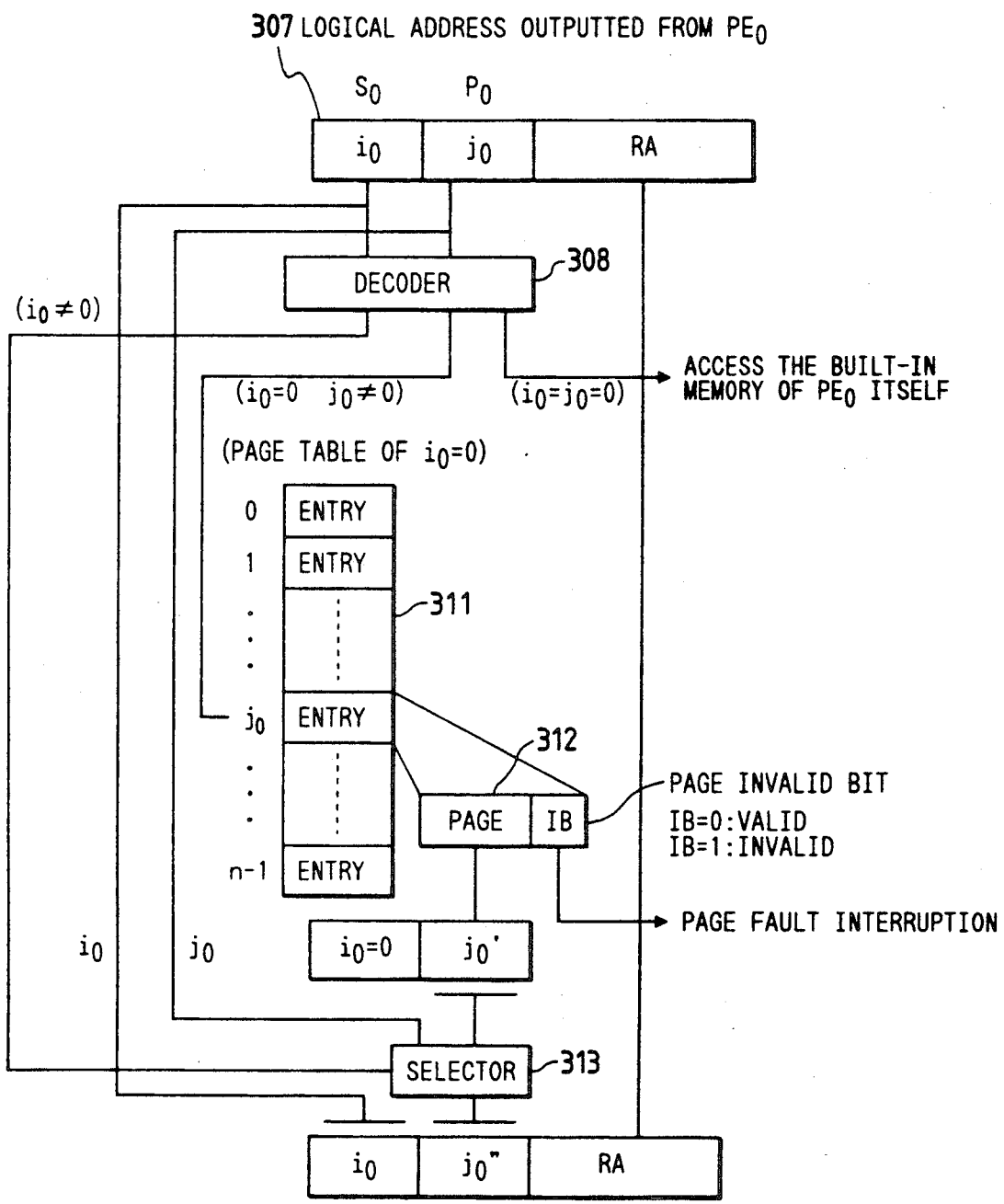
FIG. 9 is a diagram for explaining an address translation method when the lower processor is accessed from the upper processor in the present invention.

Next, referring to FIG. 9, an address translation method will be described when the shared memory in the lower processor element is to be accessed from the processor element PEo. It is assumed for simplicity that the physical address of the internal memory in each processor element have the segment S=0 and the page P=0 when each processor element itself makes the access. The logical addresses to be outputted from the processor element PEo are the $S_o, P_o$ and RA in accordance with the address format of FIG. 5. Let it be assumed that $S_o=i_o$ and $P_o=j_o$ (wherein io and jo designate the values of the segment So and the page Po). First of all, if the internal memory is to be accessed, the relations of io=jo=0 are detected by decoder 308 so that the memory owned by the PEo itself is accessed through the arbiter.

In another case in which the memory of the processor element at the segment S=0 is to be accessed, the relations of io=0 and jo≠0 are detected by the decoder 308 so that the entry of the reference jo of the address translation table DAT 311 in the PEo is called up. The content 312 of a page table 311 is composed of a real page corresponding to each logical page and a page invalid bit (IB) indicating the validity or invalidity of said real page. For IB=0, for example, said real page is valid and can be directly accessed. If the segment S=0 is outputted from the processor element $PE_o$ and if the lower processor elements of the $PE_o$ are less than (n−1), IB=1 may result. For IB=1, said real page is invalid, and the so-called "page fault interruption" is caused at the address invalid interruption by the processor $MPU_o$ in the $PE_o$. In response to the page fault, the $MPU_o$ cuts out the corresponding area from the secondary memory and loads or pages it in the real memory corresponding to said real page $j_o'$ to set the page invalid bit (IB) at IB=0 and to access a predetermined address. When the page invalid bit (IB) is at "0", the entry page of the page table 311 indicates the leading address (i.e., $j_o'$ in FIG. 9) of the page to be accessed. Since $i_o=0$, as a matter of fact, the address of S=0, P=$j_o'$ and RA is outputted as the external address of the $PE_o$.

In another case of $i_o\neq 0$, it is indicated that the segment $S_{10}$ managed by the other processor element $PE_{10}$ is indirectly accessed. In the aforementioned case, the number $i_o$ is outputted as it is. Since $i_o\neq 0$, the external output page $j_o''$ of the $PE_o$ is the page $j_o$ outputted from the $MPU_o$. For $i_o=0$ and $j_o\neq 0$, $j_o''=j_o'$, as has been described hereinbefore. Specifically, the selecting direction of a selector 313 is determined according to the value of the segment number $i_o$ so that the page address $j_o''$ outputted from the processor element $PE_o$ is selected to have either the number $j_o$ or $j_o'$.

Figure 10:
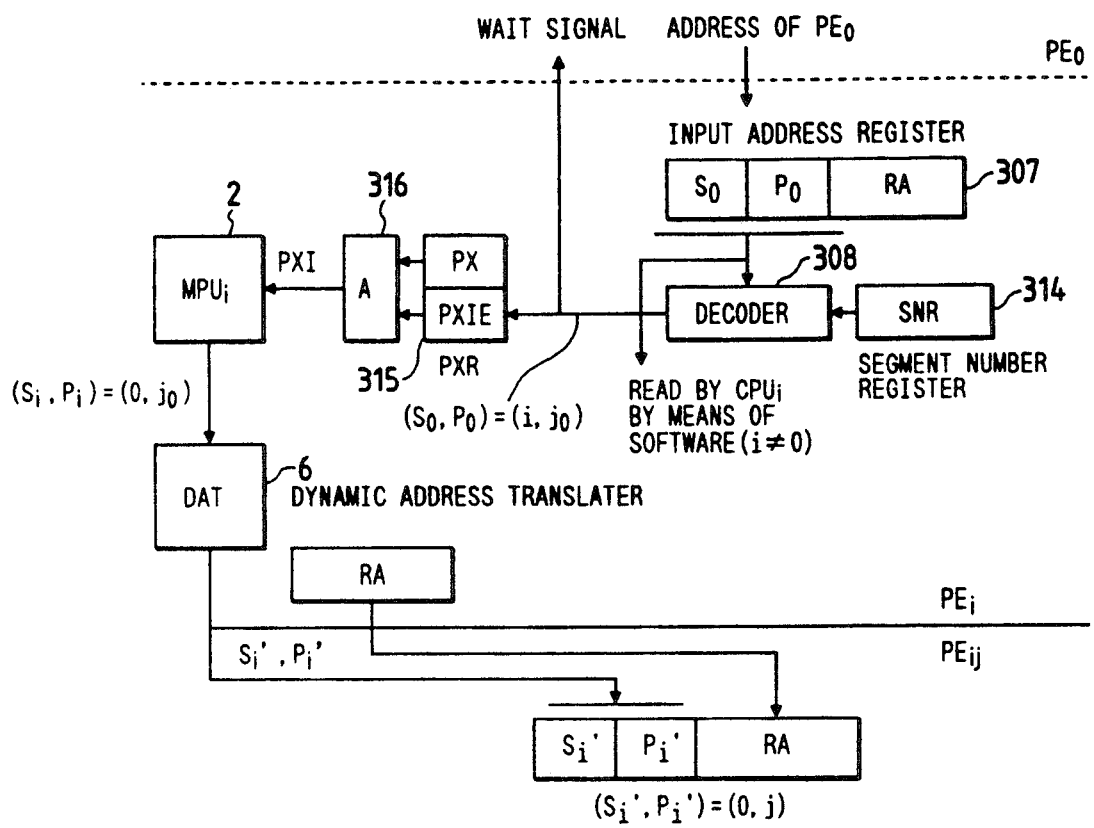
FIG. 10 is a diagram for explaining the indirect access from the upper processor in the present invention.

Although the address outputting method of the upper processor element has been described hereinbefore, an address outputting method of the lower processor element $PE_i$ to be indirectly accessed from the upper processor element $PE_o$ will be described with reference to FIG. 10. The lower processor element $PE_i$ once buffers the output address of the upper processor element $PE_o$ in the input address register 307 in response to the address strobe AS, to decodes the segment $S_o$ and the page $P_o$ with the decoder 308. Since $S_o\neq 0$ in the case of the indirect access, the relation i≠0 is detected, and a wait signal is returned to the upper processor element $PE_o$ if $(S_o, P_o)=(i, j_o)$. For the $MPU_i$ 2, a page index flag PX is set in a page index interruption control status register PXR 315 so as to indicate the indirect access. The PXR 315 has a PXI interruption enable bit PXIE. For PXIE=1, the $MPU_i$ 2 receives the input of the page index interruption PXI by taking a logical product of the PXIE and the PX with an AND operator 316. In response to the PXI, the $MPU_i$ 2 refers to the input address register 307 and outputs the logical address ($S_i$, $P_i$)=(0, $j_o$) of the $MPU_i$ 2 so as to access the logical page $j_o$ in the segment for managing the $PE_i$. By the dynamic address translator DAT 6 in the $PE_i$, the address ($S_i$, $P_i$)=(0, $j_o$) is translated into the real address ($S_i'$, $P_i'$)=(0, j) of the $PE_i$. This ($S_i'$, $P_i'$)=(0, j) and the displacement physical address RA are outputted to the lower processor $PE_{ij}$ of the $PE_i$. Since $S_i'=0$, the aforementioned address presents an address area which can be directly accessed by the $PE_i$. If PXIE=0, the interruption is disabled, and the PXI control status register PXR 315 is referred with the software of the $PE_i$ so that similar operations as those for the PXIE=1 are accomplished. Incidentally, the wait signal is continuously issued till the $MPU_i$ finishes its access to the data.

Figure 12:
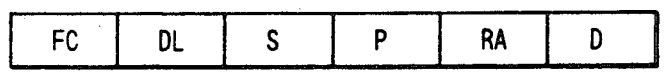
FIG. 12 is a diagram showing a data format for remote sending and reception in the present invention.
Figure 11:
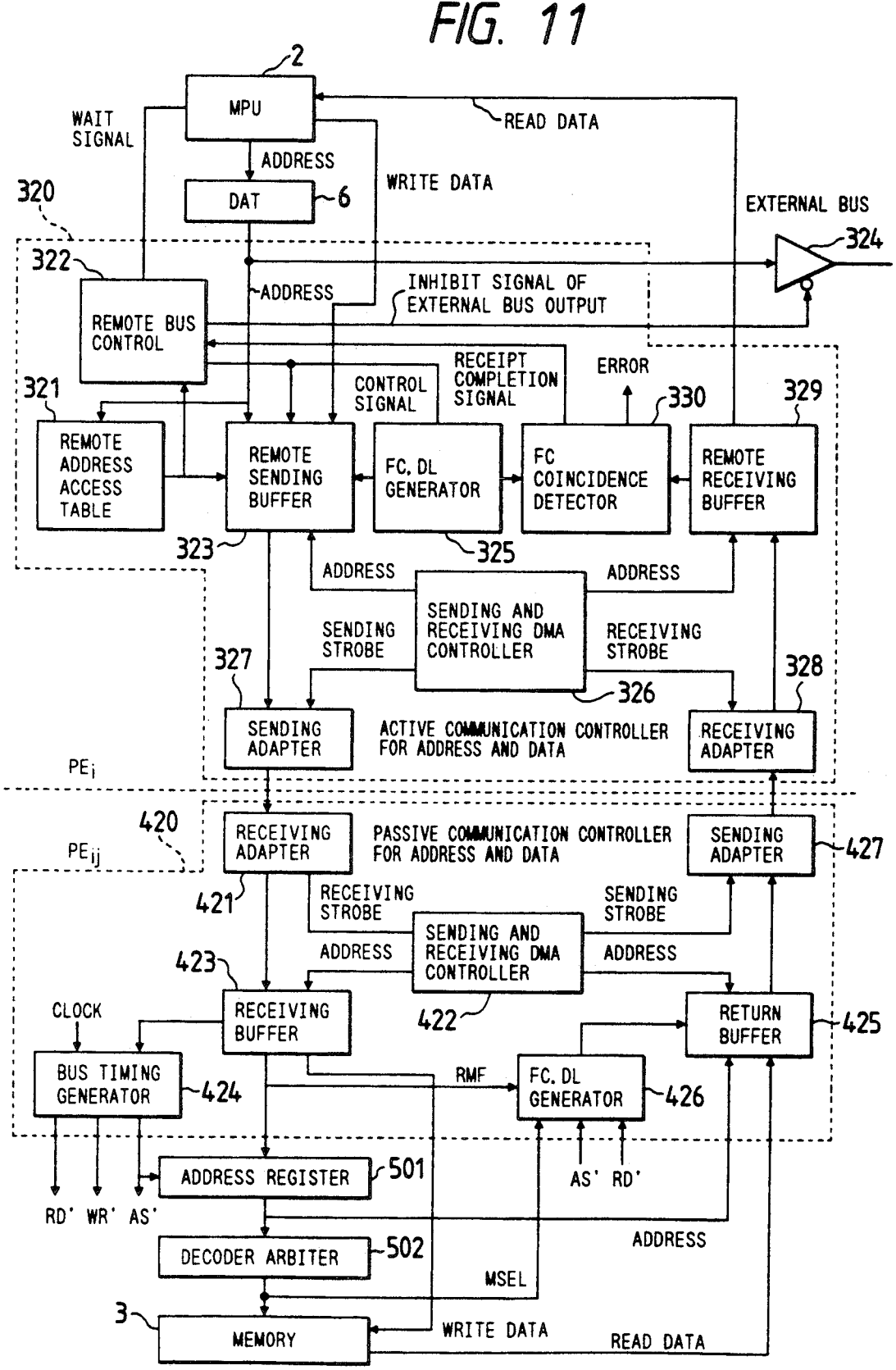
FIG. 11 is a diagram for explaining the operations of a remote access in the present invention.

Next, the case, in which a physically and logically removed processor is to be accessed (which will be called the "remote access"), will be described with reference to FIGS. 11 and 12. FIG. 11 is a diagram for explaining the operations of the remote access. FIG. 12 is a format showing the remote address output data. A processor element to perform the remote access is designated at $PE_i$, and a processor element to be subjected to the remote access is designated at $PE_{ij}$.

If the processor $MPU_i$ 2 in the $PE_i$ outputs an address through the address translator DAT 6, whether or not it is the remote access is decided with a remote address access table 321 in an active address I/O controller 320. If not the remote access, the address is outputted from the external bus as usual. If the remote access, a remote access signal or the decision result of the remote address access table 321 is outputted to a remote bus controller 322 and a remote sending buffer 323. In response to the remote access signal, the remote bus controller 322 outputs a wait signal to the $MPU_i$ 2 and an inhibit signal of the external bus output to a bus driver 324. In response to the remote access signal, moreover, the remote bus controller 322 a bus control signal to an FC & DL generator 325 and the remote sending buffer 322 so as to generate data to be set in the remote sending buffer 323. The format of the data to be set in the remote sending buffer 323 is composed, for example, a function code FC, a data length DL, the addresses S, P and RA, and data D, as shown in FIG. 12. The function code FC sets a function code in which an R/W (read/write) direction of the remote access, a data width and so on are coded. The data length DL indicates a sending data length sent from a general purpose adapter. The addresses latch the segment S, the page P and the physical address RA after having passed through the address translator DAT 302. Finally, output data corresponding to the data size of the write instruction, if so, and dummy data corresponding to the data size of the read instruction, if so. In short, the write cycle is completed by outputting the data in the case of the write operations by the remote access. In the case of the read operation, however, a wait is made till the data are returned from the general purpose communication interface. The wait signal is returned to the memory bus of the $PE_i$ from the active address I/O controller 320. The wait signal is returned from the active address I/O controller 320 to the memory bus of the $PE_i$. When the data of the format shown in FIG. 12 are latched in the remote sending buffer 323, a DMA (i.e., Direct Memory Access) controller 326 initialized in advance for the sending and receiving operations operates to perform the DMA transfer of the data of the remote sending buffer 323 to a general purpose sending adapter 327 and to output the remote access address and data from the active address I/O controller 320 of the $PE_i$.

The sending and receiving DMA controller 326 performs the same operations as those of an ordinary DMA controller. Specifically, when the bus mastership is requested of the processor $MPU_i$ 2 in the $PE_i$ and is acquired, the DMA transfer is accomplished by using the bus between the remote sending buffer 323 and the sending adapter 327. During this DMA transfer, the sending and receiving DMA controller 326 outputs the read address to the remote sending buffer 323 to sequentially read out the sending data latched in accordance with the format of FIG. 12 from the remote sending buffer. At the same time, in order that the aforementioned sending data may be directly written in the sending adapter 327 through the data bus, the sending strobe is outputted from the sending and receiving controller 326 to the sending adapter 327 so that the aforementioned sending data are sequentially outputted from the sending adapter 327.

On the other hand, the lower processor $PE_{i\ j}$ for receiving the remote access of the $PE_i$ receives the aforementioned remote access data at a receiving adapter 421 so that the remote access data are latched in a receiving buffer 423 by a receiving DMA controller 422 which has been set in advance like the sending case. When the input to the receiving buffer 423 is completed, a remote address reception complete signal is outputted from the receiving buffer 423 to a bus timing generator 423 so that the bus control signals of the remote access such as an address strobe AS', a read strobe RD' or a write strobe WR' are generated from the bus timing generator 424. In response to the address strobe AS' of the remote access, the data of the receiving buffer are latched in an address register 501 for the upper processor of the processor element $PE_{ij}$. Like the case of the direct access from the upper processor, the memory select signal MSEL is outputted through a decoder and arbiter 502 so that the write data are latched in the shared memory 3 or so that the read data are read out from the shared memory 3. In the write case, the access is completed at the write stage. In the read case, the read data are set in a return buffer 425, and a remote access flag RMF is outputted from the bus timing generator 424 and inputted to a returning FC & DL generator 426. Moreover, the memory select signal is also inputted to the FC & DL generator so that the FC and DL are generated and latched in the return buffer 425 by using the bus control signal such as the address strobe AS' or the read strobe RD' as the fundamental signal. The return data of the format, as shown in FIG. 12, are returned from the return buffer 425 to the $PE_i$ via sending adapter 427 by the sending and receiving DMA controller 422 in the $PE_{ij}$. In the $PE_i$, the return data are received in a remote receiving buffer 329 by a receiving adapter 328 and the sending and receiving DMA controller 326. It is detected by an FC coincidence detector 330 that the FC and DL of the remote receiving buffer 329 and the FC and DL of the sending FC & DL generator 325 are coincident. The reception completion is returned to the remote bus controller 322, if coincident, and an error is returned to the remote bus controller 322 if incoincident. The $MPU_i 2$ reads the data of the remote receiving buffer 329 to complete the data transfer through the remote bus controller 322 turning off the wait signal instantly. If the FC or DL is not coincident, the error signal is outputted from the FC coincidence detector 330, and a read error interruption is issued in the $MPU_i 2$ through the remote bus controller 322 to release the wait signal, thus completing the read cycle instantly.

Figure 13:
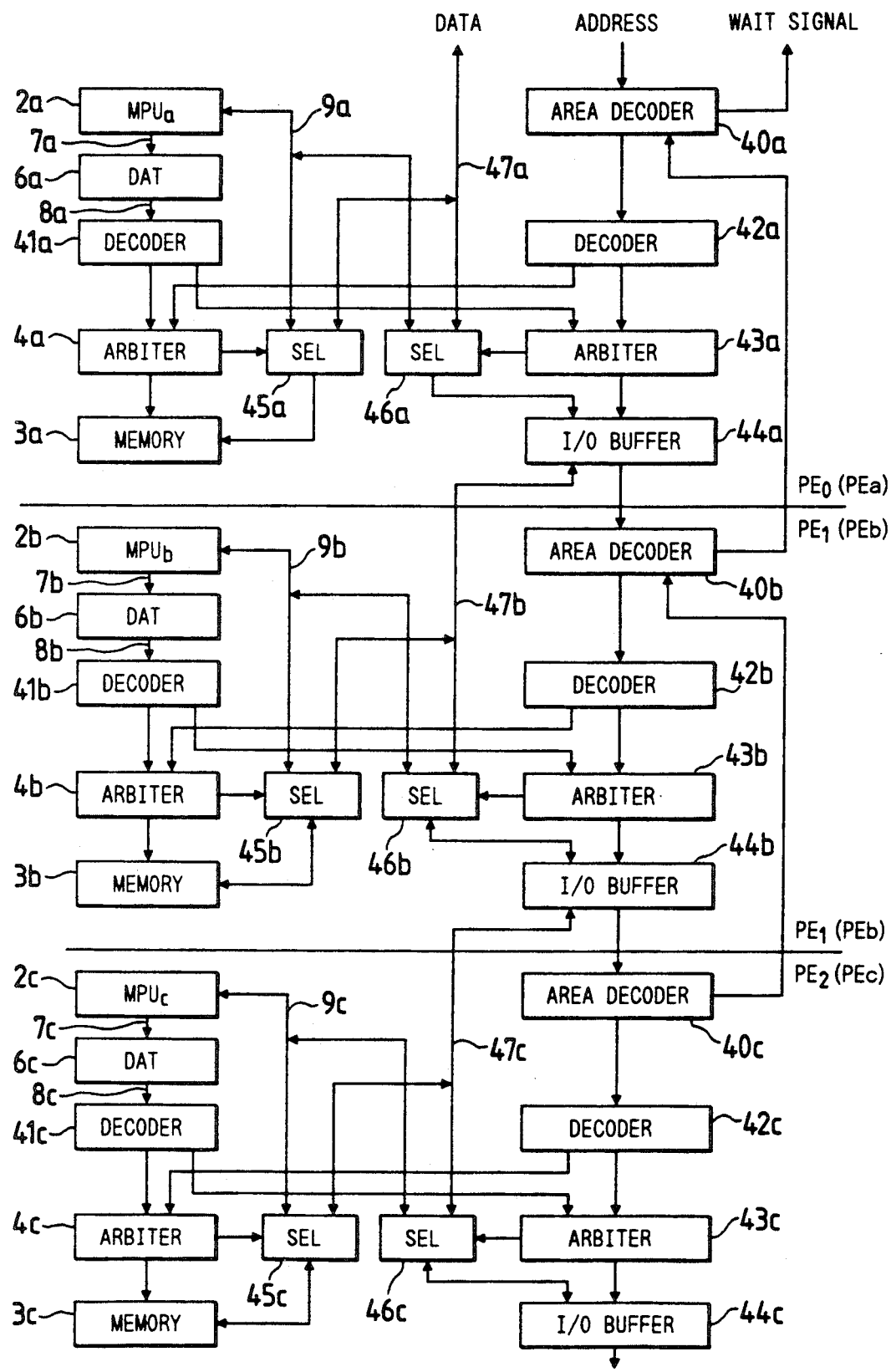
FIG. 13 is a diagram showing one embodiment of the processor for the indirect access from the upper processor element to a two-stage lower processor element by means of a hardware in the present invention.

FIG. 13 shows an embodiment in case an access from an upper processor element is relayed to realize the indirect access to the shared memory in the lower processor element with a hardware. As shown in FIG. 13, the processor elements $PE_0$ (PEa), $PE_1$ (PEb) and $PE_2$ (PEc) are individually connected in a sequential multistage such that the $PE_0$ is underlaid by the $PE_1$ and that the $PE_1$ is underlaid by the $PE_2$. The description will proceed to the case in which the processor element $PE_0$ accesses the shared memory of the processor element $PE_2$ through the processor element $PE_1$. Each processor element PE includes an MPU 2 (2a, 2b or 2c) and a dynamic address translator DAT 6 (6a, 6b or 6c) for translating a logical address 7 (7a, 7b or 7c) outputted by the MPU 2 into a physical address 8 (8a, 8b or 8c). The physical address 8 (8a, 8b or 8c) is decoded by a decoder 41 (or 41a, 41b or 41c), in which a decode signal is outputted to an arbiter 4 (4a, 4b or 4c) or 43 (43a, 43b or 43c) in dependence upon either the access to an internal shared memory 3 (3a, 3b or 3c) or the access to the lower processor connected to the external bus through the external output buffer. Likewise, the decode signal from the upper processor element is outputted to the arbiter 4 or the arbiter 43 through an area decoder 40 (40a, 40b or 40c) and a decoder 42 (42a, 42b or 42c). The arbiter 4 selects the shared memory 3 through a selector SEL 45 (45a, 45b or 45c). In case an external memory area is to be accessed, the shared memory of the lower processor element is likewise accessed from an output buffer 44 (44a, 44b or 44c) through the arbiter 43 and a selector 46 (46a, 46b or 46c). The selector 45 or 46 inputs a select signal from the arbiter 4 or 43 to select and output data 47 (47a, 47b or 47c) from the data bus 9 (9a, 9b or 9c) of the MPU or the upper processor element.

Next, the description will proceed to the case in which the processor element $PE_0$ accesses the shared memory of the processor element $PE_2$ through the processor element $PE_1$. The segment numbers S of the processor element $PE_0$, $PE_1$ and $PE_2$ are assumed to be 0, 1 and 2, respectively, in view of the $PE_0$. In order to access the shared memory 3c of the processor element $PE_2$ from the processor element $PE_0$, the segment number S=2, the page number P=0 and the physical address RA are first outputted as the logical address 7a from the MPU 2a in accordance with the format of FIG. 5. The logical address 7a is translated into the physical address 8a through the dynamic address translator 6a, but the physical address 8a is assumed for simplicity to have the same values as those of the logical address 7a. Moreover, the shared memory in each processor element is assumed to have one page. The memory spaces of the individual processor element $PE_0$, $PE_1$ and $PE_2$ in the structure of FIG. 13 are shown in FIGS. 14, 15 and 16, respectively. The memory space of the processor element $PE_0$ looks as shown in its entirety in FIG. 14. Specifically, both the segments S=0 and S=1 look as having the memory areas of two pages P=0 and P=1, and the segment S=2 looks as having the memory area of one page of P=0. The memory space of the processor element $PE_1$ is that of the processor element $PE_0$ excepting the space of S=0, as shown in FIG. 15, and looks as having the spaces of the two pages of its own processor segment S=0 and the one page of another processor segment S=2.

The memory space of the processor element $PE_2$ looks as having the space of one page of its own processor segment S=0, as shown in FIG. 16.

Reverting to FIG. 13, the flow of the address issued by the MPUa (2a) will be described. The logical address 7a outputted by the MPUa (2a) is translated by the dynamic address translator DAT 6a into the physical address 8a, which is inputted to the decoder 4a. This decoder 4a decodes the physical address 8a and that the memory area of S=2 and P=0 is the shared memory built in another processor element in the memory space of the processor element PE₀, thus outputting the access request signal to the arbiter 43a. In response to the access request signal from the decoder 42a, the arbiter 43a outputs: a select signal for selecting the MPU 2a to the selector SEL 46a; the data 9a of the MPUa (2a) to the I/O buffer 44a; and the physical address 8a of the MPUa (2a) to the I/O buffer 44a. The address outputted by the I/O buffer 44a of the processor element PE₀ is inputted to the area decoder 40b of the processor element PE₁. Since the inputted address has S=2 and P=0, the area decoder 40b decodes the accessible memory area of the processor element PE₂, i.e., the areas of S=1 and S=2 in the memory space of the processor element PE₁, as shown in FIG. 14, to output the wait signal to the upper processor element PE₀ and the address to the decoder 42b. In response to the wait signal, the processor element PE₀ extends the bus cycle while it is receiving the wait signal. The decoder 42b judges whether the access area is the shared memory built in its own processor element or the memory of the lower processor element. Since, in this case, the address has S=2 and P=0, it is decided that the memory region is that of the lower processor element, to relay and output the address to the area decoder 40c of the lower processor element PE₂ through the decoder 42b, the arbiter 43b and the I/O buffer 44b like the case of the processor element PE₀. In response to the select signal outputted from the arbiter 43b, on the other hand, the data are inputted or outputted to the I/O buffer 44b through the selector 46b in accordance with the direction of the access and are further inputted or outputted to the lower processor element PE₂ from the I/O buffer 44b in accordance with the access direction. Like the case of the processor element PE₁, the processor element PE₂ decides the area managed by its own processor element with the area decoder 40c to output the wait signal to the upper processor element. At the same time, the processor element PE₂ decodes with the decoder 42c that the address belongs to the area of the internal memory 3c of its own processor element because of S=2 and P=0. Without any access from its own processor MPU 2c, the arbiter 4c outputs the address from its upper processor element to the shared memory 3c and the select signal for selecting the data bus from its upper processor element PE₁ to the selector 45c thereby to read or write the memory 3c in accordance with the direction of the access. When the arbiter 4c outputs the select signal for selecting the bus of the upper processor element, the area decoder 40c releases the output of the wait signal to the upper processor element PE₁. When the wait signal from the lower processor element PE₂ is released, the processor element PE₁ uses the area decoder 40b the wait signal which has been outputted by the processor element PE₁ to its upper processor element PE₀.

In the access reading case, the read data of the lower processor element are naturally relayed and outputted to the output buffer 44a of the upper processor element PE₀ through the output buffer 44b and the selector 46c. When the wait signal from the processor element PE₁ is released, the access source MPUa (2a) reads the data of the data bus 9a to complete the read cycle.

In the case of the data write, the processor element PE₁ writes the data in the I/O buffer 44a to complete the data access. In the case of the write access from the upper processor, therefore, the area decoder of each processor receives, if the MPU 2 and the access of the lower processor element conflict, a bus grant signal $BG_{EXT}$ from the arbiter 4 or 43 to access the internal memory 3 of the lower processor element or the output buffer 44. The input/output control of the bus control signal (e.g., the address strobe, read strobe, write strobe or wait signal) after reception of the bus grant signal $BG_{EXT}$ is performed by the area decoder 40. By the control thus far described, the shared memory 3c of the upper processor element PE₀ to the lower processor element PE₂ can be indirectly accessed with the hardware.

As has been described in detail hereinbefore, according to the present invention, the individual processors can be inversely deemed as memory elements having processors by cascading the processor elements implementing individual memories sequentially in the multistage. Thanks to the multistage cascade structure (or the tree structure) of the memory elements, there can be attained an effect that the real memory capacity can be limitlessly expanded without depending upon the address width of the bus. As a result, the system can be expanded and large-scaled merely by adding the processor element of the same structure to the tree structure without being required to remaking the bus wiring or the arbiter.

Since, moreover, the processor is present in the aforementioned memory element, there can be attained an effect that the function distribution such as the connection into the tree structure can be easily realized.

In order to access a remote processor element by sending the addresses and the data, still moreover, there are provided the active address & data communication controller and the passive address & data communication control for sending the addresses and the data when an access is received from the remote processor element. Thus, there can be attained an effect that the logically and physically remote processor can be indirectly accessed through the memory interface to construct a system which is rich in its expandability.

What is claimed is:

1. A multiprocessor system having a plurality of processor elements, each of said processor elements comprising:
    a bus;
    a memory;
    a processing unit for outputting a logical address for addressing a logical address area of said memory;
    an address translator connected to said processing unit and said bus, for translating said logical address from said processing unit into a physical address for addressing a real address area of said memory; and
    a bus arbiter device connected to said memory, said bus and another bus included in an upper processor element, for selecting one of said physical address from said bus and another physical address from said another bus included in said upper processor element, said bus and said another bus being hierarchically structured such that said upper processor element serves as a bus master device for controlling said another bus, and for outputting said selected physical address to said memory.

2. A multiprocessor system according to claim 1, wherein said bus is a memory bus connected to said memory in each of said processor elements.

3. A multiprocessor system according to claim 2, wherein said processor elements are formed in a tree structure by connecting said memory buses of said processor elements.

4. A multiprocessor system according to claim 1, wherein said processing unit outputs the address with an address format which is composed of: a segment indicating a sequential number of a virtual address space of the processor element acting as the bus master; a page indicating a page number in said segment; and a lower physical address.

5. A multiprocessor system according to claim 1, wherein each of said processor elements further comprises:
   means for detecting an input address from said upper processor element;
   means for translating the input address from said upper processor element into a logical address of said processor element when an address existing in an address area under the direct management of said processor element but not in an internal memory area of said processor element is detected by said detecting means; and
   means for indirectly accessing a shared memory which is shared with said lower processor element, by said upper processor element by accessing the shared memory area through said lower processor element.

6. A multiprocessor system according to claim 1, wherein each of said processor elements further comprising an area number register for latching an area number indicating the address area which can be directly accessed by its own processor element.

7. A multiprocessor system having a plurality of processor elements, each of said processor elements comprising:
   a memory disposed in said processor element and shared with an upper processor element;
   an arbiter device for arbitrating the access to the memory shared between said upper processor element and said processor element which includes said arbiter device; and
   an arbiter arbitration mode register for setting the arbitration mode of said arbiter device dynamically in response to processing functions of said processor element and said upper processor element.

8. A multiprocessor system according to claim 7, wherein said arbitration mode for the dynamic setting includes a change or addition of the processing function of each of said processor element for said arbitration.

9. A microprocessor system including a plurality of processor elements each having a memory built therein, each of said processor elements comprising:
   first communication means for sending and receiving an address and data to access the memory in said processor element which is shared with a remote processor element, and accessing by at least one of a physical address for a real address area of said memory, and a logical address for logical address area of said memory; and
   second communication means including means for receiving the address and data, when accessed through said first communication means by said remote processor element, to access a memory area corresponding to said received address by said processor element in place of said remote processor element and means for sending back said access address and data read out through a read access, to said remote processor element, when said access by said remote processor element is a read access, wherein said remote processor element and said processor element are constructed in a hierarchy structure by said first and second communication means.

10. A multiprocessor system according to claim 9, wherein the sending and receiving of the address and data of said first communication means, the receiving of the access address and data by said second communication means, and the sending-back of the read data are asynchronously performed.

11. A multiprocessor system according to claim 1, wherein said each processor element comprising said processing unit, said memory, said address translator and said bus arbiter are packaged in one chip.

12. A multiprocessor system according to claim 5, wherein said each processor element comprising said means for detecting the input address, said means for translation into the logical address of said own processor element, and said means for the indirect accessing are packaged in one chip.

13. A multiprocessor system according to claim 7, wherein said each processor element comprising said shared memory, said arbiter and said arbitration mode register are packaged in one chip.

14. A multiprocessor system according to claim 11, wherein said each processor element comprising said first and second communication means are packaged in one chip.

15. A multiprocessor system including a plurality of processor elements each having a memory built therein, comprising:
   a memory bus connecting the individual ones of said processor elements in at least a three layered hierarchical structure having at least three stages, or in a three staged tree structure; and
   means for indirectly accessing the built in memory in a processor element connected to a next processor element through hardware means in said next processor element.

16. A memory access method for a multiprocessor system having a plurality of processor elements connected in a hierarchy structure, said method comprising the steps performed by each processor element of:
   translating a logical address for addressing a logical address area of a memory, outputted from a processing unit into a physical address for addressing a real address area of said memory;
   selecting one of said physical address translated in said translating step and another physical address translated in an upper processor element which is connected to said each processor element said, wherein upper processor element and said each processor element are in a hierarchy structure; and
   accessing said memory using said selected physical address.

17. A processing method for processor elements of a multiprocessor system of the type in which each of said processor elements has a memory built therein, comprising the steps of:
   sending and receiving an address and data by first communication means to access the memory in a processor element wherein the memory is shared with a remote processor element, and accessing by at least one of a physical address for addressing a real address area of said memory, and a logical address for addressing a logical address area of said memory;

receiving the address and data, when accessed through said first communication means by said remote processor element, to access a memory area corresponding to said received address by said processor element in place of said remote processor element; and sending back said access address and data read out through a read access by second communication means to said remote processor element, when said access by said remote processor element is a read access, wherein said remote processor element and said processor element are constructed in a hierarchy structure through said first and second communication means.

* * * * *